(12) United States Patent
Wang et al.

(10) Patent No.: US 11,977,422 B2
(45) Date of Patent: May 7, 2024

(54) DISPLAY PANEL, DISPLAY DEVICE AND ELECTRONIC DEVICE

(71) Applicants: Chengdu BOE Optoelectronics Technology Co., Ltd., Chengdu (CN); BOE Technology Group Co., Ltd., Beijing (CN)

(72) Inventors: Jiaxiang Wang, Beijing (CN); Binfeng Feng, Beijing (CN); Yangyang Cai, Beijing (CN); Yanli Wang, Beijing (CN); Xinqi Lin, Beijing (CN); Chao Zhang, Beijing (CN); Wei Gong, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 359 days.

(21) Appl. No.: 17/356,317

(22) Filed: Jun. 23, 2021

(65) Prior Publication Data
US 2022/0147119 A1    May 12, 2022

(30) Foreign Application Priority Data

Nov. 11, 2020 (CN) .......................... 202022599436.0

(51) Int. Cl.
*G06F 1/18* (2006.01)
*B32B 7/022* (2019.01)
*B32B 37/12* (2006.01)
*G06F 1/16* (2006.01)

(52) U.S. Cl.
CPC .............. *G06F 1/181* (2013.01); *B32B 7/022* (2019.01); *B32B 37/1292* (2013.01); *G06F 1/1652* (2013.01); *B32B 2457/20* (2013.01)

(58) Field of Classification Search
CPC .......................................... G06F 1/00–1/3296
See application file for complete search history.

(56) References Cited

U.S. PATENT DOCUMENTS

| 2016/0093685 A1* | 3/2016 | Kwon | ................. | H10K 77/111 257/40 |
| 2020/0119291 A1* | 4/2020 | Jeon | ..................... | H10K 50/844 |

OTHER PUBLICATIONS

"Rite-Lok Ultraviolet Curing Adhesives". 3M Belgium, (2007); pp. 1-2.*

* cited by examiner

*Primary Examiner* — Prashant J Khatri
(74) *Attorney, Agent, or Firm* — IPro, PLLC

(57) ABSTRACT

Provided are a display panel, a display device, and an electronic device. The display panel comprises a panel main body. The panel main body comprises a first portion, a second portion and a bendable third portion, and the third portion is located between the first portion and the second portion. A reinforcement layer is provided on a first face of the first portion to make a stiffness of the first portion higher than a stiffness of the third portion.

18 Claims, 5 Drawing Sheets

DISPLAY PANEL, DISPLAY DEVICE AND ELECTRONIC DEVICE

CROSS-REFERENCE TO RELATED APPLICATIONS

This application claims a priority to Chinese Patent Application No. 202022599436.0 filed in China on Nov. 11, 2020, the entire contents of which are incorporated herein by reference.

TECHNICAL FIELD

The present disclosure relates to the field of display technologies, and in particular to a display panel, a display device, and an electronic device.

BACKGROUND

With the development of communication technology, mobile display devices such as mobile phones and intelligent wearable devices have been widely used. In order to ensure the portability of display devices, the use of foldable or rollable display devices are a growing tendency.

SUMMARY

Embodiments of the present disclosure provide a display panel, a display device, and an electronic device.

In one aspect, embodiments of the present disclosure provide a display panel including a panel main body. The panel main body includes a first portion, a second portion and a bendable third portion, and the third portion is located between the first portion and the second portion; and a reinforcement layer is provided on a first face of the first portion to make a stiffness of the first portion higher than a stiffness of the third portion.

In some optional embodiments, the first portion is a panel region of the display panel, and the second portion is a light emitting region of the display panel.

In some optional embodiments, the reinforcement layer is made of an adhesive tape.

In some embodiments, a first edge of the reinforcement layer coincides with a boundary line of the first portion and the third portion.

In some embodiments, a golden finger area is provided on the first face of the first portion, and the reinforcement layer covers an area of the first face of the first portion other than the golden finger area.

In some embodiments, a back film is provided on a second face of the first portion and/or the second portion, the first face and the second face of the first portion are opposite to each other, and a material of the reinforcement layer is the same as a material of the back film.

In some embodiments, each of the reinforcement layer and the back film is made of an adhesive tape.

In some embodiments, a thickness of the reinforcement layer is a preset multiple of a thickness of the back film.

In some embodiments, a first adhesive layer is coated on a first face of the third portion, and a stiffness of the first adhesive layer of the third portion is lower than a stiffness of the reinforcement layer of the first portion.

In some embodiments, the first adhesive layer is made of an ultraviolet-sensitive adhesive.

In some embodiments, a back film is provided on a second face of the first portion, a first adhesive layer is coated on a first face of the third portion, a stiffness of the back film is lower than a stiffness of the first adhesive layer, and the first face and the second face of the first portion are opposite to each other.

In some embodiments, the first portion and the second portion stack by bending the third portion to form a folded structure of the display panel, and the first face of the first portion faces outside of the folded structure.

In some embodiments, a back film is provided on a second face of the first portion and a second face of the second portion, the first face and the second face of the first portion are opposite to each other, and both the second face of the first portion and the second face of the second portion face inside of the folded structure.

In some embodiments, the first portion and/or the second portion is a bendable component.

In some embodiments, panel traces are provided on the third portion, the panel traces are divided into at least two groups, and the at least two groups of panel traces intersect.

In some embodiments, the panel traces of the third portion are divided into two groups, and the two groups of panel traces extend in a same direction, are of uniformly waved shape, and intersect at a plurality of positions in the extending direction.

Embodiments of the present disclosure also provide a display device, including the display panel according to any of the above embodiments.

Embodiments of the present disclosure also provide an electronic device, including the display device according to any of the embodiments described above.

BRIEF DESCRIPTION OF THE DRAWINGS

In order to explain technical solutions in embodiments of the present disclosure or in the prior art more clearly, a brief description will be given below with reference to the accompanying drawings which are used in the description of the embodiments or the prior art. It is obvious that the drawings in the description below are only some embodiments described in the present disclosure, and a person of ordinary skill in the art can also obtain other drawings according to these drawings without inventive effort.

REFERENCE SIGNS

Figure 1:
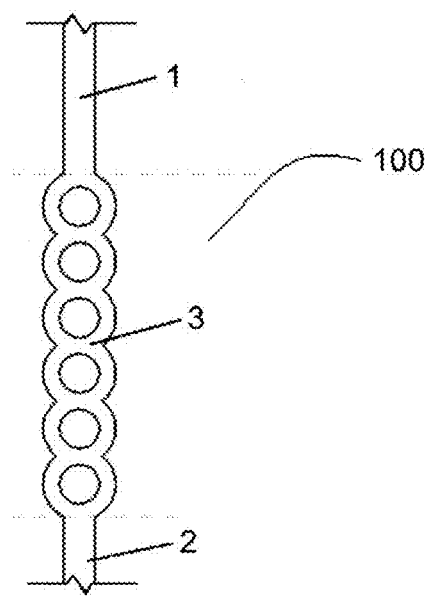
FIG. 1 is a schematic view showing a structure of a display panel when it is not bent according to an embodiment of the present disclosure.

1: first portion; 2: second portion; 3: third portion; 4: reinforcement layer; 5: back film; 6: MCL adhesive layer; 7:

bending layer; 100: panel main body; 200: polarizer; 300: chip on film packaging structure; 400: flexible circuit board; A: bend starting point; B: gold finger area; C: chamfered part.

DETAILED DESCRIPTION

In order to clarify the objectives, technical solutions and advantages of the embodiments of the present disclosure, a more complete description of the embodiments of the present disclosure will be rendered by reference to the appended drawings. It can be understood that the described embodiments are part of, but not all of, the embodiments of the disclosure. Based on the described embodiments of the present disclosure, all other embodiments obtained by a person of ordinary skill in the art without inventive effort shall fall within the scope of the present disclosure.

Unless otherwise defined, technical terms or scientific terms used in the present disclosure shall have the usual meanings understood by those with ordinary skills in the field to which the present disclosure belongs. Similar words such as "first", "second" used in the present disclosure do not indicate any order, quantity or importance, but are only used to distinguish different components. Similarly, words such as "a" or "an" do not mean a quantity limit, but rather mean at least one. Words such as "include" or "comprise" and other similar words mean that an element or item appearing before the word cover elements or items listed after the word and their equivalents. Words such as "connect" or "interconnect" are not limited to physical or mechanical connections, but may include electrical connections, whether direct or indirect. Words such as "up", "down", "left", "right", are only used to indicate a relative positional relationship, which may change accordingly when the absolute position of a described object changes.

In order to maintain the clarity and conciseness of the following description of the embodiments in the present disclosure, the present disclosure omits detailed descriptions of known functions and known components.

In order to ensure the folding or rolling performance of a foldable or rollable display device, a thinner panel material is usually selected. However, when a back film is relatively thin, it cannot play a good supporting role, and when the panel material is folded, a phenomenon that a bend starting point is not located in a bendable region will occur, causing fracture in the bendable region. Further, in order to leave more space for a complete machine, the step cutting is performed in a panel area, but the stress in the panel area is not uniform due to the generation of chamfer edges, and two ends of the panel area are tilted, resulting in fracture of the wires or traces in the display panel.

In view of the above, embodiments of the present disclosure provide a display panel, a display device and an electronic device, to solve problems in the prior art that a fracture occurs in a bendable region when a panel is folded, caused by that a bend starting point is not located in a bendable region, and wires in the display panel fracture, caused by a subsequent step cutting process in the panel region, because the stress in the panel area is not uniform due to the generation of chamfer edges, and the two ends of the panel area are tilted.

An embodiment of the present disclosure provides a display panel, particularly relates to an OLED display panel for a mobile display device such as a cell phone, an intelligent wearable device, or the like, and more particularly, relates to a foldable or rollable display device. The structure of the display panel according to the embodiment of the present disclosure is as shown in FIG. 1, the display panel includes a panel main body 100, and the panel main body 100 at least includes a first portion 1, a second portion 2 and a bendable third portion 3. The third portion 3 is located between the first portion 1 and the second portion 2, and the third portion 3 can be bent. Further, panel traces or elements related to the traces are arranged in the first portion 1, the second portion 2 and the third portion 3.

Figure 2:
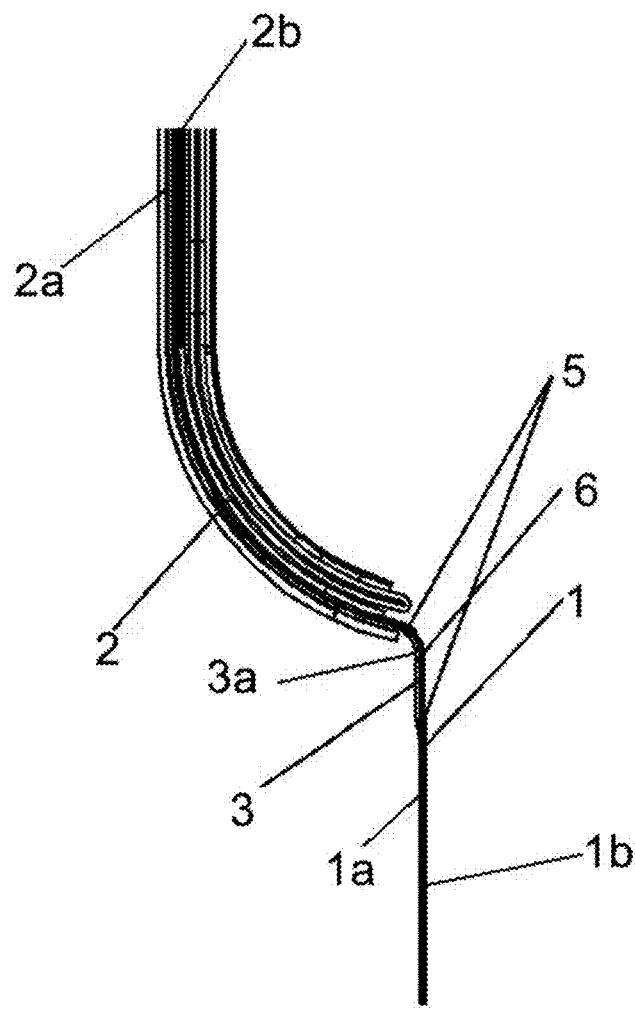
FIG. 2 is a schematic view of a structure of a display panel when it is bent according to an embodiment of the present disclosure.
Figure 3:
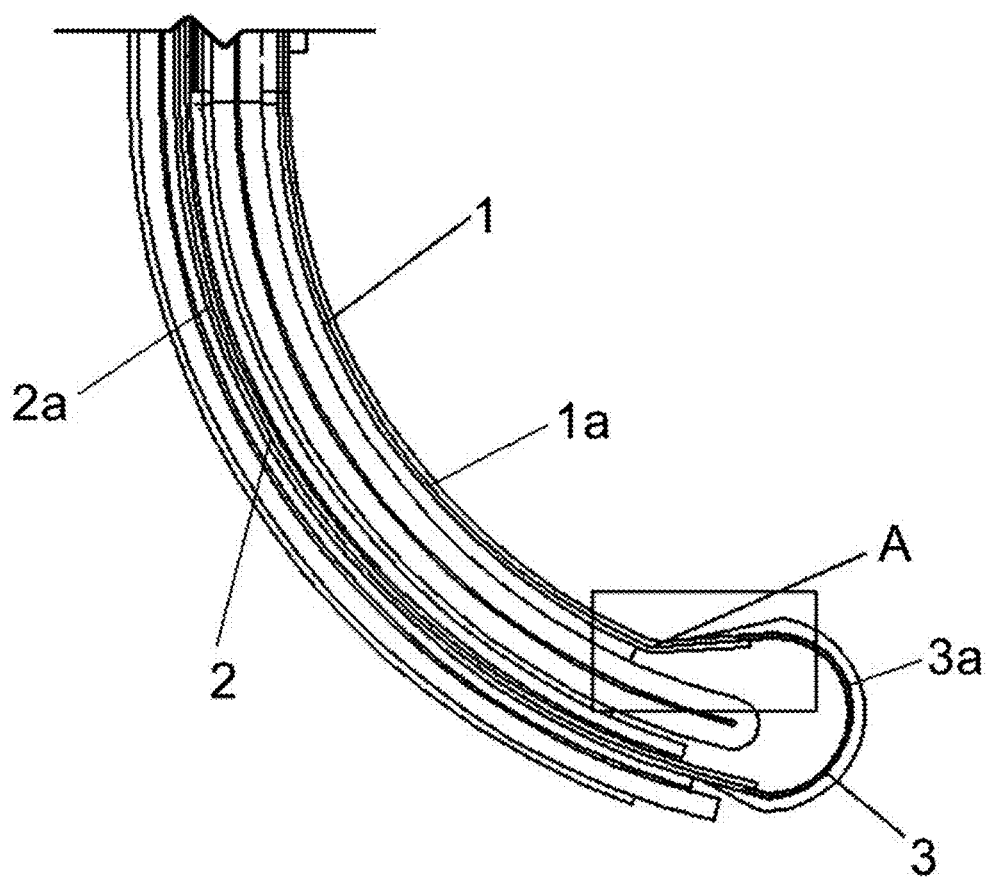
FIG. 3 is a schematic view showing a structure of a display panel after it is bent according to an embodiment of the present disclosure.

As further shown in FIG. 2, the display panel may be foldable. In particular, when the panel main body 100 of the display panel is folded, the first portion 1 and the second portion 2 located at two ends of the third portion 3 are relatively folded or stack by bending the third portion 3, so as to form a folded structure. A schematic view of the structure of the display panel forming the folded structure is shown in FIG. 3, where the first portion 1 may serve as a panel region of the display panel, and the second portion 2 may serve as a light emitting region of the display panel. In another embodiment, the first portion 1 may serve as a light emitting region of the display panel, and the second portion 2 may serve as a panel region of the display panel.

In some alternative embodiments, as shown in FIG. 2 and FIG. 3, a back film 5 is provided on a second face 1b of the first portion 1 and a second face 2b of the second portion 2, where the second face 1b of the first portion 1 and the second face 2b of the second portion 2 will face the inside of the folded structure after the panel main body 100 is folded. Accordingly, the first face 1a of the first portion 1 and the first face 2a of the second portion 2 herein will face the outside of the folded structure after the panel main body 100 is folded. The back film 5 is configured to support the first portion 1 and the second portion 2. An MCL adhesive layer 6 is coated on a first face 3a of the third portion 3, where the first face 3a of the third portion 3 will face the outside of the folded structure after the panel main body 100 is folded. In some embodiments, the MCL adhesive layer 6 may be an ultraviolet-sensitive adhesive or glue. In general, a bend starting point generated during the panel main body 100 is folded should be located in the third portion 3. However, since the thinness of the back film 5 is smaller than that of the MCL adhesive layer 6, and the stiffness of the back film 5 is lower than that of the MCL adhesive layer 6, a stiffness of the first portion 1 is lower than that of the third portion 3, so that the back film 5 cannot support the first portion 1 well. In this case, when an external force is applied to the display device during the bending of the panel main body 100, the bend starting point A where the panel main body 100 starts to be bent does not occur in the third portion 3, but moves upwards and in the first portion 1 having the relatively lower stiffness (as shown in FIG. 3), which causes that the first portion 1 in the panel main body 100 is easily bent and even broken.

Figure 4:
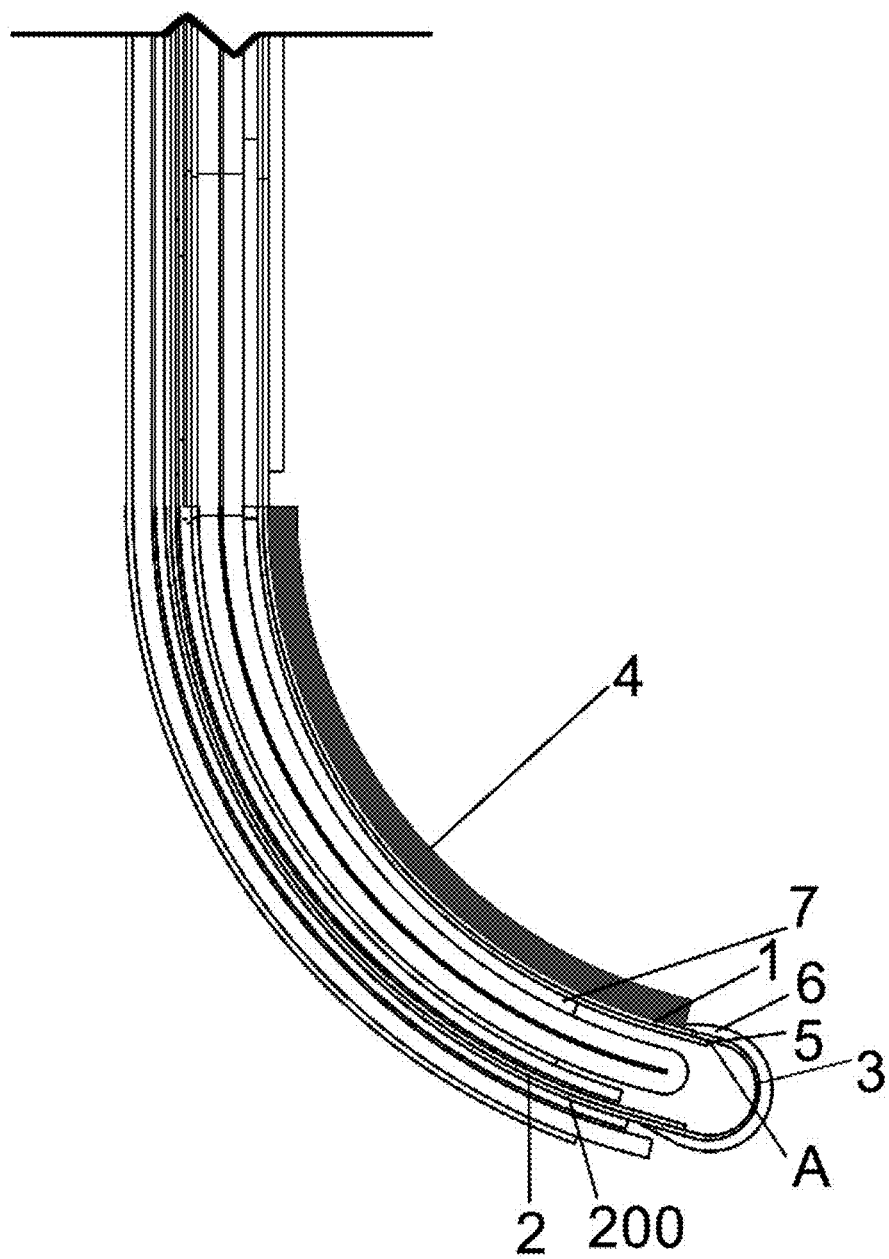
FIG. 4 is a schematic view showing a structure of a display panel after it is bent according to an embodiment of the present disclosure.

In view of this, in some embodiments, as shown in FIG. 4, a reinforcement layer 4 is provided on the first face 1a of the first portion 1, and the reinforcement layer 4 makes the stiffness of the first portion 1 higher than that of the third portion 3. In some embodiments, the reinforcement layer 4 may be in the form of a reinforcement adhesive tape, the reinforcement layer 4 may be glued or attached onto the first face 1a of the first portion 1, and the reinforcement layer 4 may also be provided on the first face 1a of the first portion 1 by means of other manners, which are not limited in the embodiments of the present disclosure. By arranging the reinforcement layer 4 on the first face 1a of the first portion 1, the stiffness of the first portion 1 can be made to exceed the stiffness of the third portion 3, so that during bending of the panel main body 100, a bend starting point A may occur in the third portion 3 having a relatively low stiffness, thereby avoiding broken or fracture of the first portion 1.

Further, considering that the back film 5 functions to support the first portion 1, and the reinforcement layer 4 functions to increase the stiffness of the first portion 1, the reinforcement layer 4 may be made of the same material as the back film 5, in order to reduce the manufacturing cost. Further, since the reinforcement layer 4 is provided to enable the stiffness of the first portion 1 to exceed the stiffness of the third portion 3, it is necessary to increase the thickness of the reinforcement layer 4 to a certain extent in order to increase the stiffness of the first portion 1 to some extent, and for this reason, the thickness of the reinforcement layer 4 may be set to a preset multiple of the thickness of the back film 5.

In some embodiments, in order to enable the bend starting point to accurately occur in the third portion 3 by arranging the reinforcement layer 4, the location of the reinforcement layer 4 may be adjusted properly, such that a first edge of the reinforcement layer 4 coincides with a boundary line of the first portion 1 and the third portion 3. In this manner, the reinforcement layer 4 can completely cover the first face 1a of the first portion 1 such that the bend starting point does not occur within the first portion 1.

Figure 5:
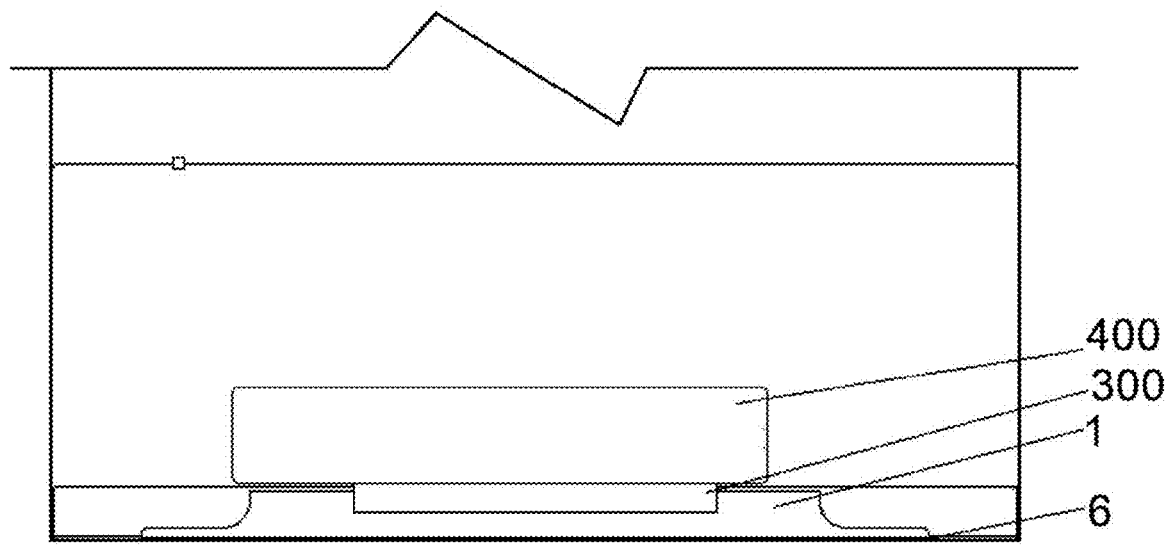
FIG. 5 is a schematic view of a first portion of a display panel according to an embodiment of the present disclosure.
Figure 6:
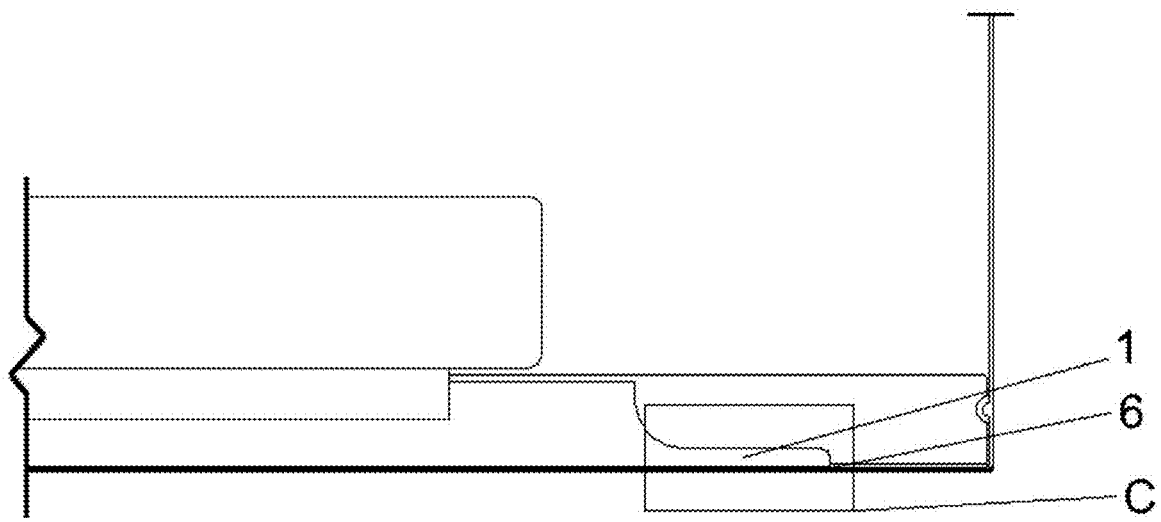
FIG. 6 is a schematic view of a chamfered part of a first portion of a display panel according to an embodiment of the present disclosure.

When manufacturing the display panel, it is necessary to perform step cutting on the first portion 1. As shown in FIG. 5 and FIG. 6, FIG. 5 is a schematic view of the first portion 1 before step cutting, and FIG. 6 is a schematic view of the first portion 1 after step cutting. A chamfered part C is formed after the step cutting of the first portion 1. When the panel main body 100 is to be bent, and a pressure is applied thereon, the chamfer part C on both sides of the first portion 1 have a poor deformation tensor, which may cause two ends upwarping phenomenon, and the two ends upwarping phenomenon can be reduced by arranging the reinforcement layer 4 on the first face 1a of the first portion 1.

Figure 7:
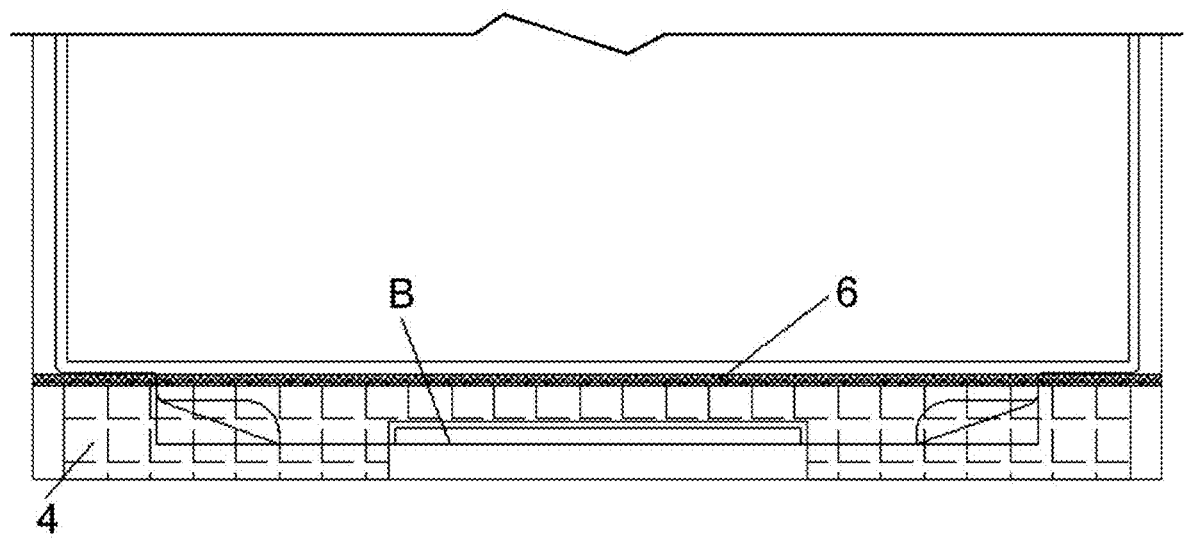
FIG. 7 is a schematic view of a gold finger area of a display panel according to an embodiment of the present disclosure.
Figure 8:
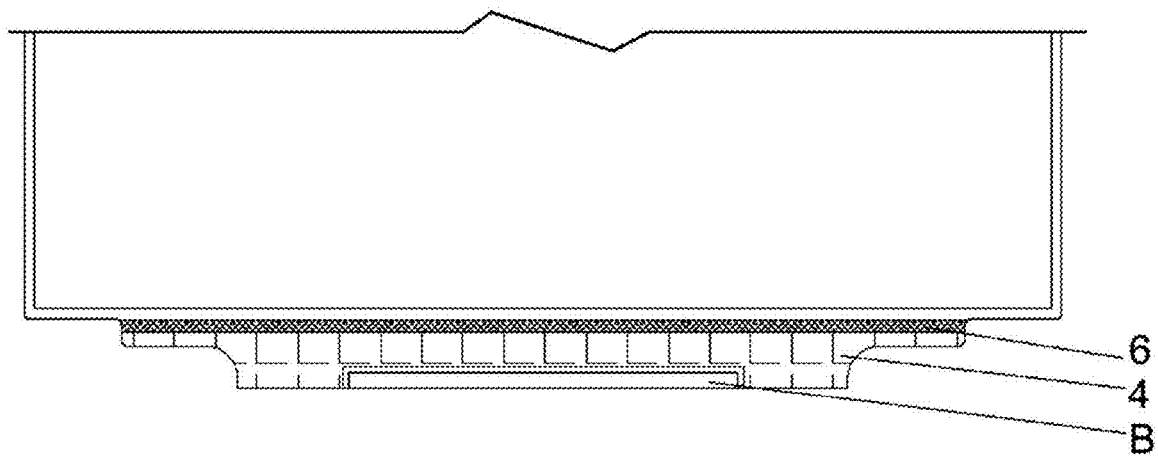
FIG. 8 is a schematic view of a gold finger area of a display panel according to an embodiment of the present disclosure.

In some embodiments as shown in FIGS. 7 and 8, a golden finger area B is provided on the first face 1a of the first portion 1, the reinforcement layer 4 covers an area of the first face 1a of the first portion 1 other than the golden finger area B. In such a design, the reinforcement layer 4 does not cover the golden finger area B, and may not affect the function of the golden finger area B. In practical applications, when the reinforcement layer 4 is provided, the reinforcement layer 4 is first made larger in size than the first portion 1, and then is grooved on the reinforcement layer 4 corresponding to the golden finger area B, so that the golden finger area B is exposed, and the reinforcement layer 4 is made the same in size as the first portion 1 after the step cutting process has been performed on the first portion 1.

The golden finger area is located on a printed circuit board of the display panel. A plurality of rectangular metal contacts are arranged in rows on the printed circuit board near an edge of the printed circuit board. The metal contacts are formed by electroplating a layer of nickel gold on the copper side of the printed circuit board. These metal contacts are part of a printed circuit board and are referred to as gold fingers due to their nickel-plated gold surface and finger-like shape. The gold fingers are used for connection between elements in the printed circuit board, and enable connection of circuits and transmission of signals. The nickel-gold layer on the surface of the gold finger can improve the insertion and extraction resistance, electrical conductivity and oxidation resistance of the gold fingers.

The first portion 1 and the second portion 2 need to be relatively bent to form a folded structure in the process of using the display panel. Considering that the display panel of the embodiments of the present disclosure may be used in various display devices to achieve folding or rolling, in order to enable the panel main body 100 to achieve more different folded shapes, the first portion 1 and/or the second portion 2 may be provided as a bendable portion. For this purpose, as shown in FIG. 4, a bendable layer 7 may also be provided on the outside of the back film 5 to facilitate the bending of the first portion 1 or the second portion 2. The bending layer 7 may take the form of a bendable adhesive tape.

In addition, as described above, corresponding panel traces or wires are arranged in the first portion 1, the second portion 2 and the third portion 3. In order to prevent traces or wires in the third portion 3 from breakage or fracture when the panel main body 100 is folded, a special panel trace structure is provided in the third portion 3, as shown in FIG. 1. Specifically, the panel traces of the third portion 3 are divided into at least two groups, and the at least two groups of panel traces are arranged to intersect, so that the at least two groups of panel traces form at least one preset shape, the stress in the traces can be uniformly distributed, and the trace breakage caused by the concentrated internal stress can be avoided or effectively reduced. As shown in FIG. 3, the panel traces of the third portion 3 are divided into two groups, and two groups of panel traces extend in a same direction, are of uniformly waved shape, and intersect at a plurality of positions in the extending direction to form a symmetrical pattern. The internal stress of the symmetrical pattern is distributed uniformly, so that it is not easy for the traces to break or crack under stress.

In the process of manufacturing the display panel of the above-mentioned embodiments of the present disclosure, as shown in conjunction with FIG. 3 and FIG. 5, the panel main body 100 is fabricated, a polarizer 200 is provided on the first face 2a of the second portion 2 of the panel main body 100, a reinforcement layer 4 is provided on the first face 1a of the first portion 1, an MCL adhesive layer 6 is coated on the third portion 3, such that an end of the MCL adhesive layer 6 is arranged in contact with the reinforcement layer 4, a chamfer cutting process is performed on the first portion 1, a chip on film (COF) packaging structure 300 and a flexible circuit board 400 are bonded to the first portion 1, an optical adhesive tape is adhered, and finally the panel main body 100 is bent to form a folded structure.

The embodiments of the present disclosure provide a display panel having a stiffness compensation design for bending, by providing a reinforcement layer on a first portion of a panel main body of the display panel in a manner such as attaching or gluing, the stiffness of the first portion is enhanced, so that a bend starting point of the panel main body when being bended appears on a bendable third portion, thereby solving the problem of the panel main body breaking due to bending, preventing a chamfered part of the first portion from upwarping or lifting up, and avoiding breakage or fracture of traces of the panel main body.

Embodiments of the present disclosure provide a display device, which adopts the display panel according to any of the embodiments described above.

Embodiments of the present disclosure provide an electronic device. The electronic device employs the display device of the above-described embodiments, and the electronic device may be a mobile terminal such as a mobile phone, a smart wearable device, or the like.

It should be understood that an orientation or positional relationship indicated by terms such as "length", "width", "upper", "lower", "front", "rear", "left", "right", "vertical", "horizontal", "top", "bottom", "inner", "outer" is an orientation or positional relationship based on the drawings, and are only for the convenience of describing the present disclosure and simplifying the description, rather than indicating or implying that the described device or element must have a specific orientation, or must be constructed and operated in a specific orientation. Therefore the description about these terms cannot be regarded as a limitation of the present disclosure.

In addition, terms such as "first" and "second" are only used for descriptive purposes, and cannot be understood as indicating or implying relative importance or implicitly indicating the number of indicated technical features. The features defined with the terms such as "first" and "second" may explicitly or implicitly include one or more of these features. In the description of the present disclosure, "a plurality of" means two or more, unless otherwise specifically defined.

Unless otherwise defined, the technical and scientific terms used herein have the same meanings as commonly understood by those skilled in the technical field of the present disclosure. The terms used herein are only for describing specific implementation purposes, and are not intended to limit the present disclosure. Terms such as "arranging" appearing in this specification may mean that one component is directly attached to another component, or that one component is attached to another component through an intermediate component. A feature described in an embodiment herein can be applied to another embodiment alone or in combination with other features, unless the feature is not applicable in the other embodiment or otherwise stated.

The present disclosure has been described through the above-mentioned embodiments. It should be understood that the above-mentioned embodiments are only for the purpose of example and description, and are not intended to limit the present disclosure to the scope of the described embodiments. Those skilled in the art can understand that more variations and modifications can be made based on the teachings of the present disclosure, and these variations and modifications shall fall within the protection scope claimed by the present disclosure.

What is claimed is:

1. A display panel, comprising a panel main body, wherein the panel main body comprises a first portion, a second portion and a bendable third portion, and the third portion is located between the first portion and the second portion; and
wherein a reinforcement layer is provided on a first face of the first portion to make a stiffness of the first portion higher than a stiffness of the third portion;
the third portion is connected to one end of the first portion, there is a notch at the one end of the first portion, forming a stepped chamfered part, and the notch is located on the side of the chamfered part away from the first face of the first portion, a surface of the chamfered part is flush with the first face of the first portion, and the reinforcement layer covers the surface of the chamfered part.

2. The display panel according to claim 1, wherein the first portion is a panel region of the display panel, and the second portion is a light emitting region of the display panel.

3. The display panel according to claim 1, wherein the reinforcement layer is made of an adhesive tape.

4. The display panel according to claim 1, wherein a first edge of the reinforcement layer coincides with a boundary line of the first portion and the third portion.

5. The display panel according to claim 1, wherein a golden finger area is provided on the first face of the first portion, and the reinforcement layer covers an area of the first face of the first portion other than the golden finger area.

6. The display panel according to claim 1, wherein a back film is provided on a second face of the first portion and/or the second portion, the first face and the second face of the first portion are opposite to each other, and a material of the reinforcement layer is the same as a material of the back film.

7. The display panel according to claim 6, wherein each of the reinforcement layer and the back film is made of an adhesive tape.

8. The display panel according to claim 6, wherein a thickness of the reinforcement layer is a preset multiple of a thickness of the back film.

9. The display panel according to claim 1, wherein a first adhesive layer is coated on a first face of the third portion, and
a stiffness of the first adhesive layer of the third portion is lower than a stiffness of the reinforcement layer of the first portion.

10. The display panel according to claim 9, wherein the first adhesive layer is made of an ultraviolet-sensitive adhesive.

11. The display panel according to claim 1, wherein a back film is provided on a second face of the first portion, a first adhesive layer is coated on a first face of the third portion, a stiffness of the back film is lower than a stiffness of the first adhesive layer, and the first face and the second face of the first portion are opposite to each other.

12. The display panel according to claim 2, wherein the first portion and the second portion stack by bending the third portion to form a folded structure of the display panel, and the first face of the first portion faces outside of the folded structure.

13. The display panel according to claim 12, wherein a back film is provided on a second face of the first portion and a second face of the second portion, the first face and the second face of the first portion are opposite to each other, and both the second face of the first portion and the second face of the second portion face inside of the folded structure.

14. The display panel according to claim 1, wherein the first portion and/or the second portion is a bendable portion.

15. The display panel according to claim 1, wherein panel traces are provided on the third portion, the panel traces are divided into at least two groups, and the at least two groups of panel traces intersect.

16. The display panel according to claim 15, wherein the panel traces of the third portion are divided into two groups, and the two groups of panel traces extend in a same direction, are of uniformly waved shape, and intersect at a plurality of positions in the extending direction.

17. A display device, comprising the display panel according to claim 1.

18. An electronic device, comprising the display device according to claim 17.

* * * * *